United States Patent [19]
Uchida

[11] 3,714,469

[45] Jan. 30, 1973

[54] SWITCHING CIRCUIT

[75] Inventor: Kosaku Uchida, Neyagawa, Japan

[73] Assignee: Matsushita Electric Industrial Co., Ltd., Osaka, Japan

[22] Filed: Aug. 27, 1971

[21] Appl. No.: 175,631

[30] Foreign Application Priority Data

Aug. 31, 1970 Japan ....................45/76546

[52] U.S. Cl. ....................307/253, 307/297

[51] Int. Cl. ....................H03k 17/60

[58] Field of Search ....................307/253, 297

[56] References Cited

UNITED STATES PATENTS

| | | | |
|---|---|---|---|
| 2,627,039 | 1/1953 | MacWilliams | 307/253 |
| 2,763,832 | 9/1956 | Shockley | 307/253 |
| 2,722,649 | 11/1955 | Immel et al. | 307/253 |
| 3,060,267 | 10/1962 | Feder | 307/253 |
| 3,335,291 | 8/1967 | Gutzwiller | 307/253 |
| 3,097,314 | 7/1963 | Harriman | 307/253 |
| 3,198,962 | 8/1965 | Lease | 307/253 |
| 3,284,692 | 11/1966 | Gautherin | 307/253 |

*Primary Examiner*—James W. Lawrence
*Assistant Examiner*—Harold A. Dixon
*Attorney*—Stevens, Davis, Miller & Mosher

[57] ABSTRACT

A switching circuit adapted for remote-control of a television receiver or the like, wherein there is provided a transistor having the collector and emitter thereof connected between a DC power source and a load, said transistor normally functioning as a voltage regulator, and by remote-control of the base current of said transistor, electric power being supplied to said load is turned on or off.

3 Claims, 7 Drawing Figures

SWITCHING CIRCUIT

This invention relates to a remote control power source switching circuit.

The objects, features and advantages of the present invention will become apparent from the accompanying drawings, in which.

Figure 1:
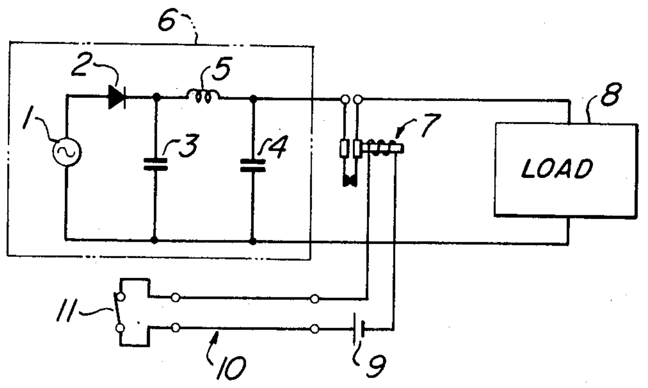
FIG. 1 PRIOR ART
FIG. 1 is a circuit diagram showing a conventional power source switching circuit.

Referring first to FIG. 1, there is shown a conventional remote-control type power source switching circuit, wherein a D.C. power source 6 is constituted by an A.C. power source 1, rectifier element 2, capacitors 3 and 4 and filter choke 5; a relay 7 is connected between the D.C. power source 6 and a load 8; and by energizing or de-energizing the relay 7 by means of a control switch 11 through a remote-control cable 10 from a remote place, the contacts of the relay 7 are closed or opened so that the D.C. power source 6 is turned on or off accordingly. A so-called wireless remote control system has also been employed, utilizing supersonic waves or the like in lieu of the cable 10.

However, the aforementioned conventional circuit has such drawbacks as follows:

1. In the case where a power source adapted to provide a great amount of electric power is to be turned on and off, difficulty is encountered in an attempt to secure a long life span for the relay contacts.

2. In the case of item 1 above, there is a possibility that fire may be caused due to sparks, and in order to prevent this, therefore, means such as a spark killer circuit or the like is required.

3. Difficulty is encountered in an attempt to achieve a miniaturized and lightened arrangement, and in addition, the relay to be used is relatively expensive.

The present invention is intended to eliminate the foregoing drawbacks.

A primary object of the present invention is to provide a circuit capable of performing switching functions stabilized for a long period of time.

A further object of the present invention is to provide a circuit which can be constructed at low cost and miniaturized without using a relay.

A still further object of this invention is to provide a circuit adapted for performing non-contact switching operations, thereby eliminating any possibility that sparking will occur.

Figure 2:
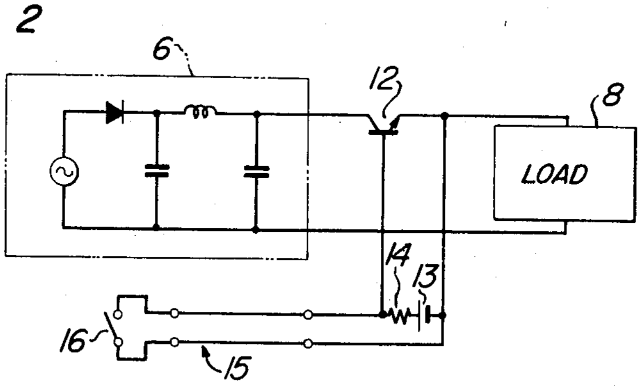
FIG. 2 is a circuit diagram showing the remote control power source switching circuit explaining the principle of the present invention.

With reference to FIG. 2, the principle of the present invention will now be described, wherein the power source 6 is similar to the conventional one described above. There is provided a power source switching transistor 12 having the collector and emitter thereof connected in forward polarity between the aforementioned power source 6 and a load 8; and a bias power source 13 connected between the base and the emitter of the transistor through a bias resistor 14, so that a sufficient base current is supplied to the transistor to render the latter conductive between the collector and the emitter thereof so that the power source 6 becomes turned on. Furthermore, a remote-control cable 15 is connected with the base and emitter of the transistor 12, and a control switch 16 is connected across the opposite end of the cable. Upon closure of the control switch 16, the power source switching transistor 12 is rendered opened between the base and the emitter thereof so that the power source 6 becomes turned off.

In this way, the power source 6 is turned on and off in the fashion of a remote-control, contactless type by opening and closing the control switch 16. The control switch may be a switch with a low power capacity because it is provided for the purpose of control. In addition, there occurs no such problems as those with relay contacts.

Figure 3:
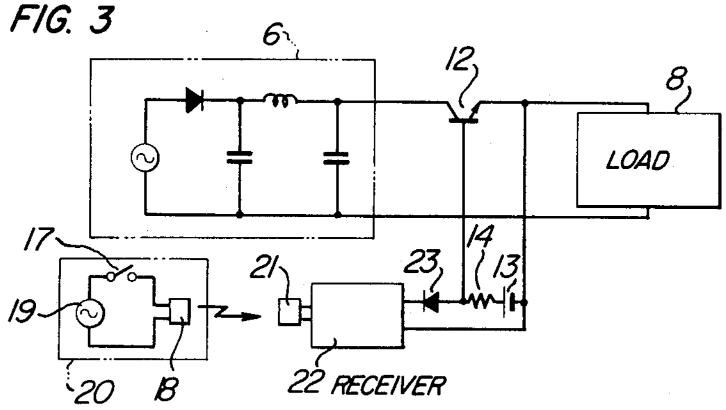
FIGS. 3 to 7 are circuit diagrams showing other circuits explaining the principle of the present invention respectively.

The embodiments shown in FIGS. 3 to 7 will be described below. FIG. 3 shows an example in which a wireless remote control system utilizing supersonic waves is employed in lieu of the aforementioned cable 15 and control switch 16. This embodiment comprises a transmitter 20 including a control switch 17, a speaker 18 and control signal source 19, and a receiver 22 including a microphone 21. Furthermore, there is provided a diode 23 which is adapted for short-circuiting the base-emitter circuit of the power source switching transistor 12 when an input signal enters the receiver 22.

Figure 4:
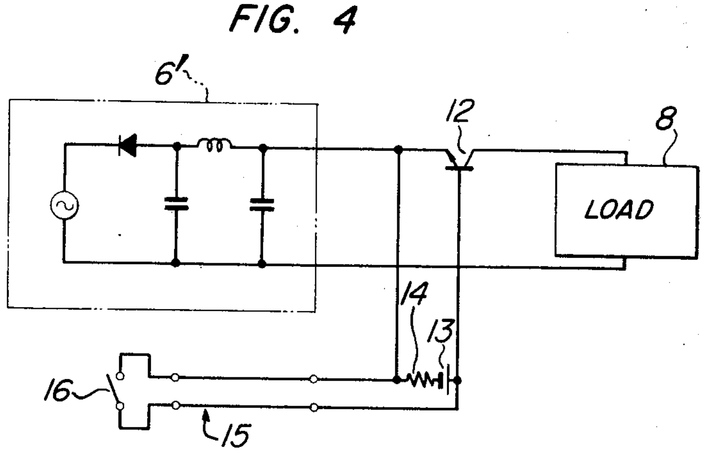

FIG. 4 shows an example wherein the circuit according to the present invention is applied to a power source 6' adapted to provide a negative voltage, with the collector-emitter connection of the power source switching transistor being reversed. This circuit operates in the same manner as that of FIG. 2.

Figure 5:
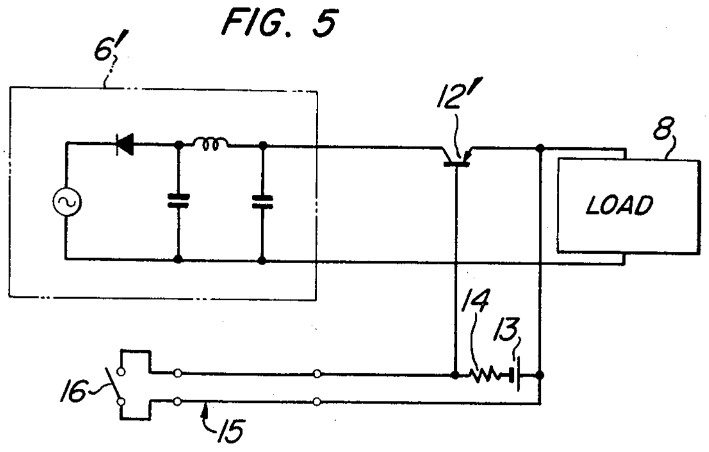

FIG. 5 shows an example wherein a PNP-type transistor 12' is employed in place of the power source switching transistor (NPN type) 12.

Figure 6:
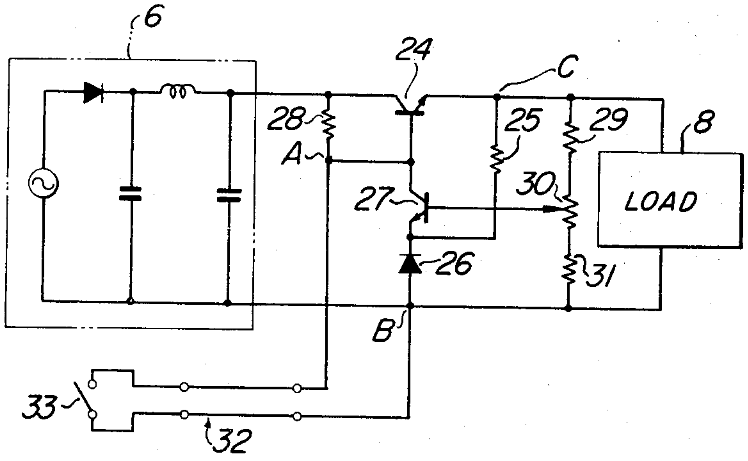

FIG. 6 shows an embodiment of the present invention wherein a voltage controlling transistor 24 constituting an automatic voltage stabilizing circuit is used for the same purpose as that of the power source switching transistor described above. Description will now be made of the construction and operation of this embodiment. From the position where a stabilized voltage is available, at the emitter of the voltage controlling transistor 24, a current is passed to a reference constant voltage diode 26 through a resistor 25. Connected with the base of the voltage controlling transistor 24 is the collector of a voltage pickup transistor 27 to which a current is passed from the non-stabilized power source 6 through a resistor 28. A voltage appearing at the emitter of the voltage controlling transistor 24 is divided by means of resistors 29, 30 and 31, and the voltage thus divided is imparted to the base of the voltage pickup transistor 27, so that the voltage at the emitter side of the voltage controlling transistor 24 is stabilized. By controlling the voltage controlling transistor 24 in the fashion of remote-control, connection or disconnection between the power source 6 and the load 8 can be effected. To this end, a cable 32 is connected between points A and B in FIG. 6, a control switch 33 is connected across the opposite end of the cable, and the control switch is opened or closed. When the control switch 33 is closed, the base voltage of the voltage controlling transistor 24 is zero, so that this transistor is rendered non-conductive, thus interrupting the current flow.

In FIG. 6, the same effect can be produced by connecting the aforementioned remote-control cable 32 between points A and C instead of between the points A and B, since the voltage between the base and the emitter of the voltage controlling transistor 24 becomes null if the control switch 33 is closed.

Figure 7:
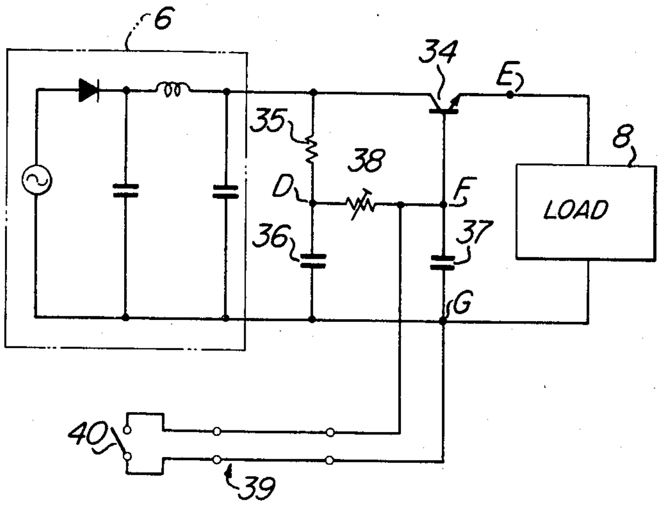

FIG. 7 shows an example wherein a voltage controlling transistor 34 constituting an APF (Active Power Filter) circuit is adapted to serve also as the power source switching transistor of the present invention. Description will now be made of the construction and operation of this embodiment. In FIG. 7, the voltage controlling transistor 34 has its collector and emitter connected between the power source 6 and the load 8. A voltage is applied from the power source 6 side to the base of the transistor 34 through a filter circuit comprising capacitors 36, 37 and resistors 35, 38, so that a voltage applied to the load 8 can be sufficiently less rippled.

In order that connection or disconnection may be achieved between the power source 6 and the load 8 by remotely controlling the voltage controlling transistor in this circuit, remote-control cable 39 is connected points F and G, and a control switch 40 is connected across the opposite end of the control cable 39. Thus, such connection or disconnection can be effected by opening or closing the control switch 40. In this case, the voltage controlling transistor 34 operates in the same way as the voltage controlling transistor 24 shown in FIG. 6. In FIG. 7, the same effect can be produced by connecting the remote-control cable to points D and G or F and E instead of to the points F and G.

It is evident that the transistor 24 in FIG. 6 and the transistor 34 in FIG. 7 are so called voltage regulators. According to the present invention, the voltage regulator is used with the power source switching device.

What we claim is:

1. A remote-control power source switching circuit comprising a transistor having the collector and emitter thereof connected between a DC power source and a load, a bias circuit for forward biasing said transistor thereby rendering it normally conductive said transistor normally functioning as a voltage regulator and a remote-control circuit for shorting said bias circuit, wherein said bias circuit is controlled by operating said remote-control circuit, so that said transistor is "on-off" controlled.

2. A remote-control power source switching circuit according to claim 1, wherein said bias circuit is provided with a circuit for controlling the conduction of said transistor by detecting a voltage imparted to the load.

3. A remote-control power source switching circuit according to claim 1, wherein a filter circuit comprising resistors and capacitors is connected between said DC power source and the base of said transistor, and an active power filter is constituted by said transistor.

* * * * *